United States Patent Office 3,845,079
Patented Oct. 29, 1974

3,845,079
METHOD OF PRODUCING ETHYLENE OXIDE IN CONJUNCTION WITH OTHER α-OXIDES
Mark Iosifovich Farberov, Prospekt Oktyabrya 39, kv. 7; Boris Nikolaevich Bobylev, Moskovsky Prospekt 82, kv. 44; and David Izrailevich Epshtein, ulitsa Nekrasova 63, kv. 26, all of Yaroslavl, U.S.S.R.
No Drawing. Filed Dec. 29, 1972, Ser. No. 319,392
Int. Cl. C07d 1/08, 1/14
U.S. Cl. 260—348.5 L
5 Claims

ABSTRACT OF THE DISCLOSURE

A method of producing ethylene oxide in conjunction with other α-oxides which consists in the epoxidation of ethylene with organic hydroperoxides in the presence of compounds of metals from Groups IV through VII used as a catalyst in an amount between 0.01 and 10 g./l.; the epoxidation takes place in an organic solvent medium under a pressure of from 50 to 300 atm. and at a temperature between 70 and 160° C. until an ethylene conversion of between 10 and 85%, in terms of the hydroperoxide, is obtained and ethylene oxide is formed. The unreacted ethylene is removed from the products of reaction either completely or partially and another olefin or a mixture of olefins with a reactivity higher than that of ethylene are introduced into the reaction mixture remaining, and said olefin or olefins are then epoxidized with the unreacted hydroperoxide under a pressure of 1 to 60 atm. and at a temperature between 20 and 160° C. in the presence of said catalysts until the conversion of the unreacted hydroperoxide is between 95 and 100% of the original amount.

BACKGROUND AND SUMMARY OF THE INVENTION

The present invention relates to methods of producing ethylene oxide in conjunction with other α-oxides.

The demand for α-oxides in general and that for ethylene oxide and propylene oxide in particular has reached a high level and is continuing to grow rapidly. The explanation for this demand is that these oxides serve as starting materials from which a variety of products can be made for use in the chemical, petroleum and textile industries, mining and other fields. These oxides also find direct application in modern technology, with ethylene and propylene oxides being used as starting materials in the manufacture of solvents, plasticizers, antifreezes, detergents and other polymers.

Many methods of producing α-oxides are known in the art as, for example, the alkaline treatment of chlorohydrins. Chlorohydrin is the product of a simultaneous contact of an olefin and chlorine in water at a temperature between 40 and 80° C. Saponification of a 7 to 10% solution of chlorohydrin by an alkali yields the requisite oxides. The yields of main products in terms of the ethylene taking part in the reaction are as follows:

| | Mole percent |
|---|---|
| Ethylene chlorohydrin | 85 |
| Ethylene oxide | 80 |

In the case of propylene oxide, the yields of propylene chlorohydrin and propylene oxide in terms of the propylene taking part in the reaction are 80 mole percent and 75 mole percent, respectively.

This method has gained some industrial recognition but has failed to come into wide-spread use due to such disadvantages as high requirements for the raw materials (chlorine and lime) and a considerable amount of waste.

Another method for obtaining α-oxides from olefins by direct oxidation is known which uses atmospheric oxygen in the presence of a catalsyt. The method of direct oxidation of ethylene over a silver catalyst is the main process used to obtain ethylene oxide at present.

The yields of ethylene oxide from the process of direct oxidation of ethylene in air over a silver catalyst at a temperature of between 250 and 300° C. under a pressure of 7 to 15 atm. amount to 60–65 mole percent in terms of the ethylene which took part in the reaction.

The main disadvantages of the above process are the comparatively low oxide yield and high power requirements averaging about 2,500 kw.-hrs. per ton of oxide. In the case of propylene oxide, the method is practically unacceptable owing to yields in terms of the propylene which took part in the reaction being as low as 40%. The oxide yields of other olefins are still lower.

A further known method of producing α-oxides from olefins and organic peracids is by the epoxidation thereof according to Prilezhaev's reaction:

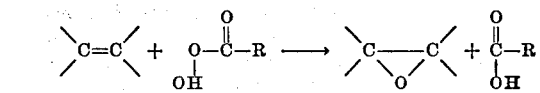

This reaction yields both lower and higher α-oxides. Its value has been proven in the epoxidation of higher olefins, but as far as ethylene and propylene oxides are concerned, their yields in terms of the respective peracid which took place in the reaction never exceed 30 to 50 mole percent. The explosiveness of the organic peracids poses a number of problems when using this method on an industrial scale.

A method of producing α-oxides by epoxidizing olefins with organic hydroperoxides in the presence of catalysts holds special promise in that, since hydroperoxides are less dangerous in handling than peracids, the latter process has an edge over the former. This reaction, a liquid-phase one, takes place in an organic solvent medium at a temperature of between 30 to 150° C. in the presence of catalysts which are compounds of elements belonging to Groups IV through VII of the periodic table, and according to the equation:

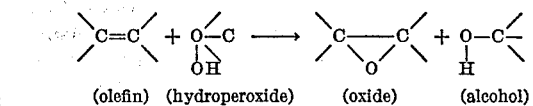

(olefin) (hydroperoxide)   (oxide)   (alcohol)

The yield of the α-oxides produced by epoxidizing C₃ olefins and those of a higher order is, as a rule, between 85 and 90 mole percent in terms of the hydroperoxide reacted and not over 95 mole percent in terms of the olefin reacted. Characteristic for this reaction is an excess of the olefin in comparison with the hydroperoxide (between 2:1 and 10:1) which is conducive to maximum oxide yield.

The main disadvantage of the above method of epoxidation of ethylene is a low oxide yield, particularly if the conversion of hydroperoxide exceeds 50 to 70%. Apparently, the explanation is that ethylene has no substitutes, fails to display polarity and therefore lends itself to epoxidation with reluctance.

In spite of the fact that under the conditions of a hydroperoxide conversion of between 50 and 70% the oxide yield is reasonably high, and there is a necessity to separate the unreacted hydroperoxide from the products of reaction and recycle the separated hydroperoxide. The separation of hydroperoxide entails its losses and results in a considerable increase in the requirements for hydroperoxide per ton of ethylene oxide no matter how high the ethylene oxide yield may be in terms of the ethylene. The very process of separating considerable amounts of hydroperoxide in the presence of even small amounts of catalyst entails the hazard of explosion. This all obviously impairs the technological value of the epoxidation by the above method.

Another disadvantage of the above method is the high rate at which active oxygen available in hydroperoxide is consumed during the oxidation of the solvent used as the reaction medium. In other words, the solvent is lost due to the oxidation. Furthermore, extra cost is involved to cope with the task of separating the inferior products of solvent oxidation from the solvent during the process of its reactivation.

Still another disadvantage is the fact that solvents which oxidize with difficulty, such as alcohols and acids, have proven to be unsuitable for the epoxidation because they slow down the process, apparently binding some of the catalyst into an inactive complex.

An object of the present invention is to provide a method of obtaining ethylene oxide together with other α-oxides which will considerably increase the yield of ethylene oxide produced and the total yield of the oxides produced by the process, reduce the solvent consumption and render the process hazardproof.

In accordance with said and other objects, the essence of the invention is that olefins are epoxidized with organic hydroperoxides in the presence of compounds of elements selected from Groups IV through VII of the periodic table which are used as a catalyst in the medium of organic solvents. According to the invention, ethylene is epoxidized under a pressure of 50 to 300 atm. and at a temperature of between 70 and 160° C. in the presence of a catalyst used in an amount of from 0.01 to 10 g./l. until an ethylene conversion in terms of the hydroperoxide of between 10 and 85% is obtained and ethylene oxide is formed; the unreacted ethylene is removed from the products of reaction either partially or completely; a reagent selected from a group comprising an olefin or a mixture of olefins with a reactivity higher than that of ethylene is added to the reaction mixture thus remaining; said reagent is then epoxidized with the unreacted hydroperoxide under a pressure of from 1 to 60 atm. and at a temperature of between 20 and 160° C. in the presence of said catalyst until the conversion of the unreacted hydroperoxide is between 95 and 100% of the original amount; and the α-oxides formed are separated one from another.

In the process of epoxidation, an alcohol having a structure the same as that of the hydroperoxide used is formed simultaneously with the transfer of active oxygen from the hydroperoxide to the olefin. Alcohols are epoxidation inhibitors because they bind some of the catalyst into an inactive complex. This impairs the rate of the main reaction whereas the side reaction of hydroperoxide decomposition, i.e.

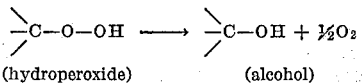

(hydroperoxide)   (alcohol)

goes on at a rate which is sufficiently high and tends to approach that of the main reaction when alcohols in a certain amount have accumulated in the reaction system. Said phenomenon is particularly true for olefins which are reluctant to epoxidize.

Beginning from a certain moment, the reaction of oxide accumulation comes practically to an end while the decomposition of hydroperoxide continues with the result that the selectivity of the reaction is reduced under the conditions of high hydroperoxide conversion. By stopping the reaction at a stage when the selectivity is high and working out the hydroperoxide with an olefin displaying a high reactivity, higher yields are obtained throughout the process.

It is quite obvious that this new approach to the principle of epoxidation consisting in the epoxidation of ethylene under a pressure higher than that used ever before followed by the epoxidation of an olefin or a mixture of olefins having a reactivity higher than that of ethylene assures a high yield of α-oxides with practically total utilization of the hydroperoxides employed in a single pass (hydroperoxide conversion exceeds 95–98%).

A point to be noted herein is that said method can readily be employed not only with ethylene but with any other olefins under the condition that the first olefin to be epoxidized is less reactive than the succeeding one. In this case, the first olefin is epoxidized until a conversion point in terms of hydroperoxide is obtained which provides for reasonably high yields and then the unreacted hydroperoxide is worked out by employing another olefin, a more reactive one, thus giving high yields of oxides under the conditions of high hydroperoxide conversion. This is, for example, a convenient way of obtaining allyl alcohol oxide (glycidol) in conjunction with oxides of butylenes (butene-2, isobutylene) or isoamylenes.

In order to reduce solvent consumption and provide for a more complete utilization of the active oxygen present in the hydroperoxide, it is preferred to carry out the process of epoxidation in accordance with the method disclosed herein in the presence of additives inhibiting the oxidation of the solvent; for use as such additives, amines, as well as phenols are exemplary. Said additives retard the oxidation of solvent without impairing the rate at which the oxidation of olefin is converted into an oxide.

Compared with the known methods, this method of epoxidation disclosed herein provides for a more complete (between 1.3 to 1.5 times the previous figure) utilization of the active oxygen present in the hydroperoxide, this oxygen being used to form ethylene oxide, and gives a total oxide process yield amounting up to 90–95 mole percent in terms of the decomposed hydroperoxide and greater than 95 mole percent in terms of the reacted olefins. The consumption of the solvent under this method is between ⅕ and ¹⁄₁₀ (depending on the type of solvent used) less than that of the previous requirements, this decrease being achieved by control of the inhibiting additives. Furthermore, the disclosed method requires a less sophisticated plant because there is no need to recover the hydroperoxide, this component being worked out more or less completely, which offers better economy and yields oxides being less contanimated with by-products. The possibility of producing ethylene oxide and other α-oxides in proportions meeting the needs of customers makes the method disclosed herein particularly attractive.

DESCRIPTION OF THE PREFERRED EMBODIMENTS

The disclosed method is embodied as follows:

The epoxidation takes place in a reactor of a known type comprising a combination of heat exchangers, vessels or columns. In said reactor, the heat liberated during the reaction is removed through the heat-exchanging arrangements or by using partial evaporation of the reaction mass or employing both methods simultaneously.

The epoxidation reactor is charged with ethylene, solvent, hydroperoxide, catalyst and other reagents such as those inhibiting the oxidation of the solvent, if necessary. The ingredients can each be fed separately or in various combinations. Quantitatively, the entire amount of each ingredient can be added at one time or in small portions throughout the process.

The epoxidation of ethylene takes place at a temperature of between 70 and 160° C. (the preferable range is 95 to 120° C.) and under a pressure of 50 to 300 atm. (preferably between 90 and 110 atm.). As the catalyst preference is given to molybdenum compounds soluble in hydrocarbons, such as molybdenum naphthenate, molybdenum abietate, molybdates of fatty acids, etc. in amounts of between 0.01 to 10 g./l. Solvents which have proven their superiority for the epoxidation process are aromatic and aliphatic compounds, toluene being among them. Among the hydroperoxides, the best suitable for this process are the tertiary alkyl hydroperoxides as, for example, hydroperoxides of tertiary butyl and tertiary amyl all of which are readily available and thermally stable under the conditions of ethylene epoxidation.

In order to provide for a high ethylene oxide yield in terms of hydroperoxide, the process of ethylene epoxidation is stopped when a hydroperoxide conversion of between 10 to 85% is reached; after that the ethylene is removed either partially or completely and another olefin, such as propylene, for example, is introduced into the reaction mixture thus remaining. Fractional distillation of the products of reaction in order to remove the ethylene with a simultaneous introduction of propylene into the same distillation column is one of the possible ways of substituting the ethylene with another olefin. Apart from the olefin, which is introduced at the second stage of epoxidation, an additional amount of catalyst, solvent, hydroperoxide, or inhibitor can be added.

The second stage of the reaction involves the epoxidizing of the more reactive olefin which requires a temperature of 20 to 160° C. and a pressure of between 1 and 60 atom.; the reaction is stopped when the hydroperoxide conversion is between 95 and 100%. The products of the reaction and the solvent are separated by a known method as, for example, fractional distillation. The solvent and some of the catalyst are recycled and partially reactivated to a considerable extent.

The method can be operated continuously or batchwise, with the results of epoxation at both stages remaining the same.

The present invention will be best understood from a number of specific examples which follow.

Example 1

The reactor was charged with 15 g. of tertiary butyl hydroperoxide, 45 g. of toluene, 0.03 g. of molybdenum abietate. After that ethylene was introduced in an amount required to build up a pressure of 100 atm. with a simultaneous increase in the temperature inside the reactor of up to 100° C.

Upon reaching an ethylene conversion of 60% in terms of the hydroperoxide, the reactor was cooled down, the ethylene bled therefrom and then 25 g. of propylene were introduced into the reactor. The temperature was increased to 80° C. and propylene was epoxidized under a pressure of 15 atm. until all the hydroperoxide was worked out completely (99% conversion). The reaction mixture was separated in a distillation column. The yields of ethylene oxide and propylene oxide were 92 mole percent and 95 mole percent, respectively, in terms of the reacted hydroperoxide and 97 or 98 mole percent in terms of the reacted olefins.

Example 2

The experiment was conducted on the same lines as the foregoing one except that the ethylene conversion of 68% in terms of the hydroperoxide was reached and part of the ethylene was removed from the cooled down reactor (some 50% of the unreacted amount). After that 35 g. of isoamylenes (mainly 2-methyl buten-2) were introduced into the reaction mixture remaining. The temperature in the reactor was increased to 60° C. and the reaction took place under a pressure of 5 atm. so that a 99% conversion was attained. The products of reaction were separated in a distillation column. The yields of ethylene oxide and isoamylene oxides were 90 mole percent and 98 mole percent, respectively, in terms of the reacted hydroperoxide and 98 mole percent in terms of the reacted olefins.

Example 3

The reactor was charged with 15 g. of tertiary butyl hydroperoxide, 45 g. of heptane, 0.03 g. of molybdenum abietate. After that ethylene was introduced in an amount required to build up a pressure of 100 atm. with a simultaneous increase in the temperature inside the reactor of up to 105° C.

Upon reaching an ethylene conversion of 65% in terms of the hydroperoxide, part of the ethylene was removed from the cooled down reactor only partially (85% of the unreacted amount) and then 60 g. of $C_{12}$–$C_{20}$ olefins were introduced into the reaction mixture (the higher olefins were mainly $C_{13}$, $C_{14}$ and $C_{15}$ fractions). The reaction with α-olefins took place at a temperature of 100° C. under a pressure of 1 atm. until all the hydroperoxide was worked out completely (99% conversion). The yield of ethylene oxide and that of the oxides of higher olefins was 80 mole percent and 95 mole percent in terms of the reacted hydroperoxide and 97 mole percent in terms of the reacted olefins (practically quantitive).

Example 4

The reactor was charged with 15 g. of ethyl benzene hydroperoxide, 45 g. of toluene and 0.03 g. of molybdenum stearate. After that ethylene was introduced in an amount required to build up the pressure to 100 atm. with a simultaneous increase in the temperature inside the reactor of up to 110° C. Upon reaching an ethylene conversion of 20% in terms of the hydroperoxide, ethylene was removed from the cooled down reactor in an amount of 95% of the unreacted one and then 40 g. of propylene were introduced into the reaction mixture remaining.

The reaction with propylene was conducted at a temperature of 100° C. under a pressure of 60 atm. until all the hydroperoxide was completely expended (99% conversion). The reaction mixture was separated in a distillation column. The yields of ethylene oxide and propylene oxide in terms of the hydroperoxide reacted were 80 mole percent and 90 mole percent, respectively; the yield in terms of the reacted olefins was practically a quantitive one.

Example 5

A reactor was charged with 500 g. of tertiary butyl hydroperoxide, 2000 g. of toluene, 0.6 g. of ionol (2,6-di-tributyl 4-methylphenol) and 2.1 g. of a fatty acid molybdate. Ethylene was introduced into the reactor in an amount required to build up the pressure to 110 atm. with a simultaneous increase in the temperature of up to 130° C. The epoxidation was continued until an ethylene conversion of 84% in terms of the hydroperoxide was obtained and then all the ethylene was bled from the reactor. Upon adding 440 g. of propylene to the reaction mixture, the balance of hydroperoxide was worked out at a temperature of 110° C. and under a pressure of 25 atm. The yields of ethylene oxide and propylene oxide were 86 mole percent and 95 mole percent, respectively, in terms of the reacted hydroperoxide; the yields in terms of the reacted propylene and reacted ethylene were practically quantative ones. The consumption of the solvent amounted to 1% in terms of the oxides formed.

Example 6

The reactor was charged with 660 g. of tertiary butyl hydroperoxide, 2600 g. of toluene, 2.5 g. of molybdenum naphthenate and 0.4 g. of diphenyl-N,N'-n-phenylene diamine. Ethylene was introduced into the reactor in an amount required to build up a pressure of 95 atm. with a simultaneous increase in the temperature of up to 130° C. The ethylene conversion in this case was 75% in terms of the hydroperoxide, the ethylene oxide yield amounted to 80 mole percent in terms of the decomposed hydroperoxide and was practically a quantitative one in terms of the reacted ethylene. Upon bleeding all the ethylene, 400 g. of isoamylenes were introduced into the reactor and the reaction proceeded until all the hydroperoxide had been worked out. The isoamylene oxide yield was 97 mole percent in terms of the reacted hydroperoxide and 99 mole percent in terms of the reacted isoamylene. The consumption of the solvent amounted to 1.5 wt. percent in terms of the oxides formed.

Example 7

The reactor was charged with 640 g. of isopropylbenzene hydroperoxide, 2600 g. of isopropylbenzene and 2.5 g. of vanadium acetylacetonate. Ethylene was introduced into the reactor in an amount required to build up the pressure to 120 atm. with a simultaneous increase in the temperature of up to 120° C. The reaction of epoxidation took place until an ethylene conversion of 15% in terms of the hydroperoxide was obtained. The ethylene oxide yield reached 60 mole percent in terms of the decomposed hydroperoxide and was practically a quantative one in terms of the reacted ethylene. Upon bleeding all the ethylene, 700 g. of isoamylenes were introduced into the reactor and the reaction was carried out at 60° C. and 4 atm. until all the hydroperoxide had been expended. The yield of oxides of isoamylenes was 90 mole percent in terms of the reacted hydroperoxide and 99 mole percent in terms of the reacted isoamylenes.

Example 8

The reactor was charged with 250 g. of tertiary butyl hydroperoxide, 1000 g. of benzene, 0.3 g. of ionol and 1 g. of molybdenum abietate. Ethylene was introduced into the reactor in an amount required to build the pressure up to 55 atm. with a simultaneous increase in the temperature of up to 120° C. The ethylene conversion was 62% in terms of the hydroperoxide. The ethylene oxide yield was 79 mole percent in terms of the reacted hydroperoxide and 98 mole percent in terms of the reacted ethylene. The balance of hydroperoxide was worked out with 200 g. of propylene at 100° C. and 20 atm. The propylene oxide yield was 96 mole percent in terms of the reacted hydroperoxide and approaching a quantitative one in terms of the reacted propylene. The consumption of solvent amounted to 1.8% in terms of the oxides formed.

Example 9

The reactor was charged with 6.6 g. of tertiary butyl hydroperoxide, 26 g. of toluene, 0.02 g. of fatty acid molybdate and 0.04 g. of hydroquinone. Ethylene was introduced into the reactor in an amount required to build up a pressure of 270 atm. with a simultaneous increase in the temperature of up to 110° C. The ethylene conversion was 85% in terms of the hydroperoxide and the ethylene oxide yield was 84 mole percent. Upon bleeding off all the ethylene, 4 g. of isoamylenes were introduced into the reactor and the reaction was carried on at 90° C. and 5 atm. until all the hydroperoxide had been worked out. The yield of isoamylene oxide was 97 mole percent in terms of the reacted hydroperoxide and a quantitative one in terms of the reacted isoamylene.

Example 10

The reactor was charged with 240 g. of tertiary butyl hydroperoxide, 1000 g. of toluene, 0.2 g. of hydroquinone, 1 g. of molybdenum pentachloride and 0.5 g. of titanium acetylacetonate. Ethylene was introduced into the reactor in an amount required to build up a pressure of 110 atm. with a simultaneous increase in the temperature of up to 160° C. The reaction proceeded until the ethylene conversion became 25% in terms of the hydroperoxide, and the reactor was then cooled down, and the ethylene bled completely and a mixture of n-butanes in an amount of 250 g. was added into the reactor. The temperature was increased to 100° C. and the reaction was continued under a pressure of 6 atm. until all the hydroperoxide had been worked out (98% conversion). The yield of oxides exceeded 95 mole percent in terms of the consumed olefins, that of ethylene oxide was 70 mole percent in terms of the hydroperoxide and the yield of oxides of butylenes amounted to 92 mole percent.

What is claimed is:

1. A method of producing ethylene oxide together with other α-oxides, comprising the steps of epoxidizing ethylene with an organic hydroperoxide in the presence of a catalyst comprising a compound of a metal from Groups V and VI of the periodic table, in a medium of a hydrocarbon solvent, the ethylene being under a pressure of from 50 to 300 atm. and a temperature of 70–160° C., until 10 to 85 percent of hydroperoxide is converted to form ethylene oxide; removing at least partially the unreacted ethylene from the reaction products; adding another olefin or a mixture of olefins having a higher reactivity than ethylene to the remaining reaction mixture, and epoxidizing said reagent with the unreacted hydroperoxide until 95–100 percent of the original amount of the unreacted hydroperoxide is converted, under a pressure of 1 to 60 atm., and at a temperature of 20–160° C., in the presence of said catalyst.

2. The method of claim 1, wherein the catalyst is selected from the group consisting of compounds of molybdenum or vanadium taken in an amount of from 0.01 to 10 g./l.

3. The method of claim 1, wherein the solvent is selected from the group consisting of aliphatic and aromatic hydrocarbons.

4. The method of claim 1, wherein the epoxidizing process is carried out in the presence of an agent which inhibits oxidation of the solvent, said agent being selected from the group consisting of amines and phenols.

5. The method of claim 1, wherein the olefin having a higher reactivity than ethylene is selected from the group consisting of olefins or mixtures thereof having 3 to 20 carbon atoms.

References Cited

UNITED STATES PATENTS 3,351,635   11/1967   Kollar _____ 260—348.5 L

NORMA S. MILESTONE, Primary Examiner